US006999620B1

(12) United States Patent
Harville

(10) Patent No.: US 6,999,620 B1
(45) Date of Patent: Feb. 14, 2006

(54) SEGMENTING VIDEO INPUT USING HIGH-LEVEL FEEDBACK

(75) Inventor: Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 10/006,687

(22) Filed: Dec. 10, 2001

(51) Int. Cl.
*G06K 9/34* (2006.01)
(52) U.S. Cl. ............... 382/173; 382/103; 382/159; 382/164
(58) Field of Classification Search ........... 382/103, 382/106, 156–159, 164, 173, 176, 180, 224–228; 358/464; 706/20
See application file for complete search history.

(56) References Cited

U.S. PATENT DOCUMENTS

| | | | | |
|---|---|---|---|---|
| 5,625,749 | A | * 4/1997 | Goldenthal et al. | 704/254 |
| 5,699,449 | A | * 12/1997 | Javidi | 382/156 |
| 5,764,803 | A | 6/1998 | Jacquin et al. | |
| 5,915,044 | A | 6/1999 | Gardos et al. | |
| 6,072,542 | A | * 6/2000 | Wilcox et al. | 348/722 |
| 6,075,875 | A | 6/2000 | Gu | |
| 6,141,433 | A | 10/2000 | Moed et al. | |
| 6,188,777 | B1 | * 2/2001 | Darrell et al. | 382/103 |
| 6,249,613 | B1 | 6/2001 | Crinon et al. | |
| 6,263,088 | B1 | 7/2001 | Crabtree et al. | |
| 6,272,480 | B1 | * 8/2001 | Tresp et al. | 706/44 |
| 6,625,310 | B1 | * 9/2003 | Lipton et al. | 382/173 |
| 6,658,136 | B1 | * 12/2003 | Brumitt | 382/103 |
| 6,661,918 | B1 | * 12/2003 | Gordon et al. | 382/173 |
| 6,801,662 | B1 | * 10/2004 | Owechko et al. | 382/224 |

FOREIGN PATENT DOCUMENTS

WO WO 00/34919 6/2000
WO WO 00/77735 12/2000

OTHER PUBLICATIONS

Grimson et al., "Using Adaptive Tracking to Classify and Monitor Activities in a Site," Proceedings of IEEE Conference on Computer Vision and Pattern Recognition, Jun. 23-25, 1998, pp. 22-29.*
(From IDS) Bhat et al., "Motion Detection and Segmentation Using Image Mosaics," IEEE International Conference on Multimedia and Expo, vol. 3, Jul. 30-Aug. 2, 2000, pp. 1577-1580.*
T. Boult, R. Micheals, X. Gao, P. Lewis, C. Power, W. Yin, A. Erkan. "Frame-Rate Omnidirectional Surveillance and Tracking of Camouflaged and Occluded Targets." At the web site http://fizbin.eecs.lehigh.edu/ tboult/FRAME/, and on the CD (but not the printed version) of Proceedings of the IEEE ICCV99 Frame-rate Workshop, Corfu, Greece, Sep. 1999.

(Continued)

*Primary Examiner*—Bhavesh M. Mehta
*Assistant Examiner*—Yubin Hung

(57) ABSTRACT

Systems and methods of segmenting video input are described. These systems and methods use feedback processing that operates on levels of information above the pixel level, such as image regions, frame-wide statistics, or object and event semantics. In one aspect, one or more pixel-level historical models of spatially local pixel observations is maintained. Pixels are segmented into two or more labeled groups based at least in part upon comparison of pixel-level video input with the one or more pixel-level historical models. The pixel-level historical models are updated based at least in part upon feedback maps identifying pixels respectively segmented into the one or more labeled groups in conformity with a spatially non-local segmentation model.

45 Claims, 4 Drawing Sheets

OTHER PUBLICATIONS

J. Orwell, P. Remagnino, G. Jones. "From Connected Components to Object Sequences." In Proceedings of the IEEE International Workshop on Performance Evaluation of Tracking and Surveillance, Grenoble, France, Apr. 2000.

K. Bhat, M. Saptharishi, P. Khosla. "Motion Detection and Segmentation Using Image Mosaics." In Proceedings of the IEEE International Conference on Multimedia and Expo 2000, New York, New York (United States), Aug. 2000.

M. Harville, G. Gordon, J. Woodfill. "Foreground Segmentation Using Adaptive Mixture Models in Color and Depth." In Proceedings of the IEEE Workshop on Detection and Recognition of Events in Video, Vancouver, Canada, Jul. 2001.

A. Mittal, D. Huttenlocher. "Scene Modeling for Wide Area Surveillance and Image Synthesis." In Proceedings of the IEEE Conference on Computer Vision and Pattern Recognition, pp. 160-167, Hilton Head, South Carolina (United States), Jun. 2000.

K. Toyama, J. Krumm, B. Brumit, B. Meyers, "Wallflower: Principles and Practice of Background Maintenance." In Proceedings of the International Conference on Computer Vision, pp. 255-261, Corfu, Greece, Sep. 1999.

* cited by examiner

SEGMENTING VIDEO INPUT USING HIGH-LEVEL FEEDBACK

TECHNICAL FIELD

This invention relates to systems and methods of segmenting video input using high-level feedback.

BACKGROUND

Many computer vision and video processing applications, in domains ranging from surveillance to human-computer interface to video compression, rely heavily on an early step, often referred to as "foreground segmentation" or "background removal" that attempts to separate novel or dynamic objects in the scene ("foreground") from what is normally observed ("background"). Recently, Time-Adaptive, Per-Pixel Mixtures Of Gaussians (TAPPMOGs) have become a popular choice for real-time modeling of scene backgrounds. In these methods, the time series of observations at a given image pixel is treated as independent of that for all other pixels, and is modeled using a mixture of Gaussians. The per-pixel models are updated as new observations are obtained, with older observations losing influence over time. At each time step, a subset of the Gaussians in each per-pixel model is selected as representative of the scene background, and new observations that are not well-modeled by those Gaussians are designated as foreground.

Among real-time foreground segmentation methods, those based on TAPPMOGs have gained favor because they can adapt to occasional, persistent scene modifications (such as the moving of a chair or a change in global illumination) while simultaneously modeling parts of the background whose appearance changes frequently, but in a repeating manner (such as a tree swaying in the wind, or pavement moving in and out of shadow due to passing cars). However, TAPPMOG methods rarely, if ever, produce the ideal foreground segmentation desired by an application.

In the context of person-oriented applications relying on static cameras, where we hope that background removal leaves only the people in the scene, TAPPMOG modeling is challenged by a number of phenomena that commonly occur in relatively unconstrained environments such as home living rooms, retail stores, or the outdoors. For example, a person wearing blue jeans and walking on a blue carpet is effectively "camouflaged" to some extent, so that he is difficult to separate from the background model. Failures due to camouflage can be reduced by tightening the differencing method for separating foreground and background, but this makes the system more sensitive to erroneous foreground inclusions caused by shadows, inter-reflections, and subtle lighting variations. Another tradeoff exists in reducing the duration of temporary errors caused by rapid changes in global illumination, in camera gain or position, or in the location of background objects such as furniture. TAPPMOG systems eventually adapt to such changes, but will produce foreground errors in the meantime. Increasing the adaptation rate shortens the time these errors exist, but also causes the people to be incorporated into the background model more quickly when they remain in the scene for extended periods of time. Two people who enter the scene and stop to have a conversation will more quickly fade into the background, and at high-traffic regions of the scene, where the true background is frequently obscured by multiple foreground objects, the background model will degrade more quickly. Although TAPPMOGs provide some tolerance to dynamic background objects such as rotating fans, video displays, and foliage or flags waving in the breeze, they usually are not able model them perfectly, so that these objects sometimes are segmented as foreground.

SUMMARY

The invention features systems and methods of segmenting video input that address the above-described phenomena with processing that operates on "higher" levels of information, such as image regions or frames, or semantics of objects and events.

In one aspect, the invention features a method of segmenting video input characterized by a time series of video frames of observable pixel data. In accordance with this inventive method, one or more per-pixel historical models of spatially local pixel observations are maintained. Pixels are segmented into two or more labeled groups based at least in part upon comparison of video input pixels with the one or more per-pixel historical models. The per-pixel historical models are updated based at least in part upon feedback maps that each identifies pixels respectively segmented into the one or more labeled groups in conformity with a spatially non-local segmentation model.

As used herein, the term "spatially local" refers to observations, properties or factors that relate to only a relatively small region of an image frame. For example, an image region encompassing a particular pixel and nearby pixels would be considered a "spatially local" image region. In contrast, the term "spatially non-local" refers to observations, properties or factors that relate to image regions that extend beyond the spatially local level. For example, a segmentation model that considers image regions or frames, classifies objects, or analyzes other scene properties above the spatially local level would be considered a spatially non-local segmentation model.

Embodiments of the invention may include one or more of the following features.

In some embodiments, a history of pixel observations is modeled at each pixel by a mixture of Gaussian distributions. These models may be used to segment pixels into, for example, a background group and a foreground group.

In some embodiments, a spatially non-local segmentation model may define spatially non-local observation characteristics of pixels belonging to one of the labeled groups. A "positive" feedback image map may identify pixels correctly segmented into this group. At these pixels, the per-pixel historical model of pixel observations corresponding to all other labeled groups may not be updated.

In some embodiments, a spatially non-local segmentation model may define spatially non-local observation characteristics of pixels that should have been excluded from one of the labeled groups. A "negative" feedback image map may identify pixels incorrectly segmented into this group. At these pixels, the updating of the per-pixel historical models of pixel observations corresponding to this group may occur in a modified way. This modification may comprise maintaining a per-pixel model of pixel observations that caused the pixel to be incorrectly segmented into one group. We refer to these models as per-pixel "inclusion error" models. The parts of an inclusion error model corresponding to individual pixels may consist of respective mixtures of Gaussian distributions. In some embodiments, the per-pixel historical model corresponding to some labeled group may be updated by merging that model with the per-pixel inclusion error model corresponding to that group.

The feedback map may be generated based at least in part upon an analysis of spatially non-local video frame features.

For example, the feedback map may be generated based at least in part upon one or more of an image region analysis, a frame-wide image analysis, or an analysis of the object or event content of the video frames. One or more of the feedback maps may be generated based at least in part upon depth information or stereo disparity information, or both.

In some embodiments, one or more confidence maps associating pixels with respective measures of segmentation accuracy may be generated. Multiple confidence maps may be merged to produce a merged confidence map. In one embodiment, the measures of segmentation accuracy are real numbers, and the step of merging multiple confidence maps comprises adding the multiple segmentation accuracy measures respectively associated with each pixel. The merged confidence map may be thresholded one or more times at different values to produce feedback maps. Each of the confidence maps may be generated based at least in part upon one or more of an image region analysis, a frame level analysis, or a semantics level analysis.

In some embodiments, depth data may be incorporated into the video segmentation process. For example, one or more pixel-level historical models may incorporate per pixel depth information or stereo disparity information, or both. In addition, pixels may be segmented based at least in part upon per pixel depth information or stereo disparity information, or both.

The invention also features a system and a computer program for segmenting video input.

Among the advantages of the invention are the following.

By extending segmentation considerations beyond the level of isolated pixels, the invention may accommodate applications in which the definition of the ideal foreground segmentation depends, for example, on concepts such as region cohesiveness, frame-wide illumination changes, or object classification.

In addition, the invention enables feedback correction of the pixel-level background model by higher levels. This feature reduces the impact of segmentation problems, such as error overload, error propagation, wasted resources, foreground omissions, and problems specific to pixel-oriented applications.

The invention also provides a mechanism for the sharing of error correction capabilities among all modules that depend on the pixel-level segmentation. Each such module may use pixel-wise maps of positive and negative feedback to attempt to impress upon the pixel-level historical model some definition of foreground that is best expressed through "higher-level" primitives, such as image region properties or semantics of objects and events. By pooling the foreground error corrections of many high-level modules into a shared, pixel-level model in this way, we improve the quality of the foreground segmentation and the performance of all modules that make use of it. For example, by having each high-level module detect errors and attempt to remove them at the pixel level, all other modules that make use of the pixel-level results will not have to deal with the same errors. In a system with N modules detecting different types of segmentation errors based on high-level concepts, it is preferable to pool their corrections in a single place, instead of relying on $N^2$ communication paths to transmit these corrections between the various modules.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
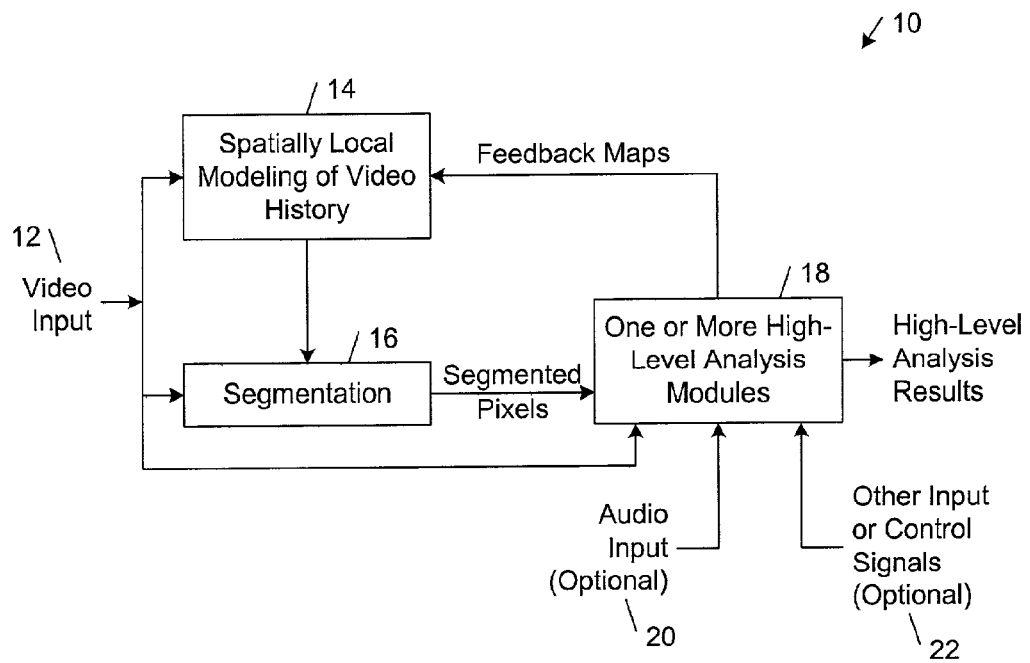
FIG. 1 is a block diagram of a system for segmenting video input based at least in part upon feedback from a high-level analysis of the video input and the segmentation results.

Referring to FIG. 1, in one embodiment, a system 10 for segmenting video input 12 includes a video history modeling module 14, a segmentation module 16, and one or more high-level analysis modules 18. Video input 12 is characterized is by a time series of video frames of observable pixel data that may be captured by a conventional video camera, a stereo camera, or other types of camera. As explained in detail below, video history modeling module 14 maintains one or more pixel-level historical models of spatially local pixel observations. Video history modeling module 14 is configured to update the pixel-level historical models based at least in part upon one or more feedback maps generated by the one or more high-level analysis modules 18. Segmentation module 16 segments pixels into two or more labeled groups (e.g., a background group and a foreground group) based at least in part upon comparison of pixel-level video input with the pixel-level video model maintained by video history modeling module 14. Video input pixels may be segmented into the labeled groups, their intersections, or their complements according to whether or not the pixels fit the various models. Each feedback map identifies pixels that are respectively segmented into one or more labeled groups in conformity with one or more spatially non-local segmentation models. The spatially non-local segmentation models each may define spatially non-local observation characteristics of pixels belonging to one of the labeled groups or of pixels that are excluded from one of the labeled groups, or both. The spatially non-local segmentation models each may be defined in terms of spatially non-local aspects of the video input 12, audio input 20 or other input or control signals 22.

The historical modeling and segmentation processes respectively performed by the video history modeling module 14 and the segmentation module 16 for one embodiment are described in the next section. The feedback map generation process performed by the one or more high-level analysis modules 18 and the process of incorporating the high-level feedback information into the one or more historical models are described for one specific implementation in the section entitled "Corrective Feedback."

The following description is based upon embodiments in which pixels are segmented into a background group and a foreground group. Other embodiments may segment pixels into different types of labeled groups or a greater number of labeled groups, or both. In addition, the following description is based upon embodiments in which the video history modeling module 14 maintains a single pixel-level historical model of spatially local observations. In other embodiments, video history modeling module 14 may maintain multiple pixel-level historical models.

Background Removal at the Pixel Level

On-Line Clustering Of Observations

Our pixel-level background modeling method regards the time series of observations at each pixel as an independent statistical process. Each pixel observation consists of a color and a depth measurement. We represent color in the YUV space, which allows us to separate luminance and chroma. We obtain the depth measurement, denoted as D, from a real time stereo camera implementation, but it could also be computed by methods based on active illumination, lidar, or other means. The observation at pixel i at time t can be written as $\vec{X}_{i,t} = [Y_{i,t} U_{i,t} V_{i,t} D_{i,t}]$.

The history of observations at a given pixel, $[\vec{X}_{i,1}, \ldots, \vec{X}_{i,t-1}]$, is modeled by a mixture of K Gaussian distributions. We choose K to be the same for all pixels, typically in the range of 3 to 5. The probability of the current observation at pixel i, given the model built from observations until the prior time step, can be estimated as $$P(\vec{X}_{i,t} \mid \vec{X}_{i,1}, \ldots, \vec{X}_{i,t-1}) = \sum_{k=1}^{K} w_{i,t-1,k} * \eta(\vec{X}_{i,t}, \vec{\mu}_{i,t-1,k}, \Sigma_{i,t-1,k}) \quad (1)$$

where $\eta$ is a Gaussian probability density function, $w_{i,t-1,k}$ is the weight associated with the $k^{th}$ Gaussian in the mixture at time t−1, and $\vec{\mu}_{i,t-1,k}$ and $$\Sigma_{i,t-1,k}$$

mean YUVD vector and covariance matrix of this $k^{th}$ Gaussian. The weights $w_{i,t-1,k}$ indicate the relative proportions of past observations modeled by each Gaussian. A diagonal covariance matrix is used. For notational simplicity, we will denote the $k^{th}$ Gaussian of a mixture as $\eta_k$.

To update a pixel's mixture model as new observations are obtained over time, we use an on-line K-means approximation. When a new observation $\vec{X}_{i,t}$ at a given pixel is received, we attempt to find a match between it and one of the Gaussians $\eta_k$ for that pixel. If a matching $\eta_k$ is found, we adapt its parameters using the current observation; if not, we replace one of the Gaussians with a new one that represents the current observation. The matching process is carried out by first sorting the Gaussians in a mixture in order of decreasing weight/variance, and then selecting as a match the first $\eta_k$ whose mean is sufficiently near $\vec{X}_{i,t}$. A match between $\vec{X}_{i,t}$ and $\eta_k$ is allowed if each squared difference between corresponding components of $\vec{X}_{i,t}$ and the mean $\vec{\mu}_{i,t-1,k}$ of $\mu_k$ is less than some small multiple $\beta$ of the corresponding $\eta_k$ component variance. The parameter $\beta$ is typically chosen to be about 2.5.

We modify this basic matching method, however, to account for the possibility of unreliable chroma or depth data. At low luminance, the chroma components (U and V) of our color representation become unstable, so we do not use chroma information in attempting to match the current observation $\vec{X}_{i,t}$ to the mean of Gaussian $\eta_k$ when the luminance of either falls below a threshold $Y_{MIN}$. Similarly, because stereo depth computation relies on finding small area correspondences between image pairs, it does not produce reliable depth data in regions of little visual texture and in regions, often near depth discontinuities in the scene, that are visible in one image but not the other. Most stereo depth implementations attempt to detect such cases and label them with one or more special values, which we denote collectively as invalid. When either the depth of $\vec{X}_{i,t}$ or the depth statistics of $\eta^k$ are judged unreliable, we omit depth in comparing $\vec{X}_{i,t}$ and $\eta^k$.

We further modify the basic matching method by increasing the color matching tolerance $\beta$, typically by a factor of 2, when the current depth and the depth mean of $\eta_k$ are both reliable and are a match. This form of "depth-based adaptive color matching" helps mitigate erroneous foreground inclusions of strong shadows (which match the background in depth but not as well in color) and dynamic background objects (such as video displays or rustling foliage) whose depth remains somewhat constant but whose color at a given pixel is highly variable.

If $\vec{X}_{i,t}$ and some $\eta_k$ are found to match, we adapt the parameters of $\eta_k$ toward $\vec{X}_{i,t}$ in a recursive fashion. The mean is updated as follows:

$$\vec{\mu}_{i,t,k} = (1-\alpha)\vec{\mu}_{i,t-1,k} + \alpha \cdot \vec{X}_{i,t} \quad (2)$$

The variance parameters are updated analogously, using the squared differences between the components of $\vec{X}_{i,t}$ and $\eta_k$. The parameter $\alpha$ can be interpreted as a learning rate: as $\alpha$ is made smaller, the parameters of $\eta_k$ will be perturbed toward new observations in smaller incremental steps.

No variances are allowed to decrease below some minimum value, so that matching does not become unstable in scene regions that are static for long periods. In addition, the luminance variance floor is kept at a substantial level, so that luminance changes caused by shadows and inter-reflections less often result in matching failures.

The weights for all Gaussians are updated according to $$w_{i,t,k} = (1-\alpha)w_{i,t-1,k} + \alpha \cdot M_{i,t,k} \quad (3)$$

$M_{i,t,k}$ is 1 (true) for the $\eta_k$ that matched the observation and 0 (false) for all others, so Equation (3) causes the weight of the matched $\eta_k$ to increase and all other weights to decay. If no match is found, the Gaussian ranked last in weight/variance is replaced by a new one with a mean equal to $\vec{X}_{i,t}$, an initially high variance, and a low initial weight.

Background Model Estimation and Foreground Segmentation

At each time step, one or more of the Gaussians in each per-pixel mixture are selected as the background model, while any others are taken to represent foreground. We designate the current observation at a pixel to be part of the foreground if it was not matched to any of the $\eta_k$ in the pixel's current background model.

We select background Gaussians at each pixel according to two criteria. First, among the Gaussians with reliable depth statistics (those for which the fraction of observations modeled that have valid depth exceeds the threshold p) and whose normalized weight $$w'_k = \frac{w_k}{\Sigma_k w_k}$$

exceeds a threshold $T_D$, we select the $\eta_k$ with the largest depth mean. This criterion is based on the fact that, in general, we do not expect to be able to see through the background. The threshold $T_D$ discourages the selection of a background model $\eta_k$ based on spurious or transient observations. We set $T_D$ around 0.1 to 0.2, so that we can select an $\eta_k$ representing the true background even when it is usually not visible.

Next, we select additional $\eta_k$, in order of decreasing weight/variance, until the total weight of the selected Gaussians exceeds a second threshold T. This is most useful where the true background corresponds to a Gaussian with unreliable depth statistics (because the depth measurements are often labeled invalid), or where the background is truly multi-modal, such as for swaying trees.

Experimental Results

We evaluated the performance of our pixel-level foreground segmentation method on a challenging color-and-depth test sequence captured by a stereo camera head. The camera head makes use of special-purpose hardware for depth computation, and allowed us to save spatially registered color and depth imagery to files at 15 Hz for 320×240 resolution.

The test sequence is 10 minutes long, with no image being devoid of "foreground" people. It contains several dynamic background objects, namely several video displays (toward the upper left of the images) and a sign rotating about a vertical axis at about 0.5 Hz (upper middle of images, sitting on oval-shaped table). During the first half of the sequence, two displays ("display1" and "display2") are active and one ("display3") is off, while two people walk around the room. Near the midpoint of the sequence, the chair in the lower left of the image is moved to new floor position, "display2" is switched off, "display3" is switched on, and several more people enter the scene. One of these people stands in the middle back part of the room, and remains there for the rest of the sequence, sometimes shifting his weight or moving his arms. The other new people walk around continuously in the lower right part of the images, creating a "high-traffic" area.

Figure 2:
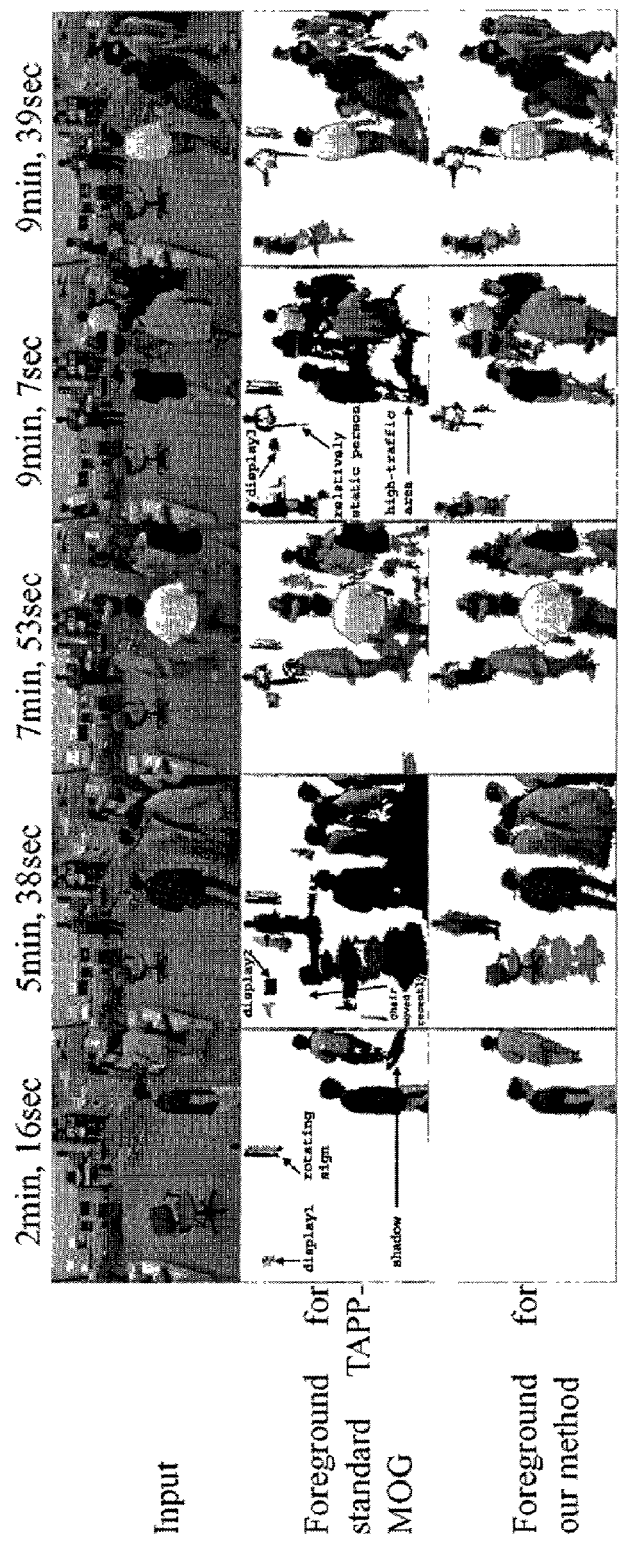
FIG. 2 is a view of a series of video frames and a comparison of the results of two different foreground segmentation techniques.

Referring to FIG. 2, we compare results for our method with those for a more standard TAPPMOG technique that employs an RGB input space rather than YUVD. In general, our method has much greater success in handling the test sequence challenges described above. For example, it better excludes the video is displays and rotating sign from the foreground, in large part because of depth-based adaptive color matching, which allows a heavier reliance on depth data where color is highly variable. This same mechanism, along with our use of a luminance-normalized color space, largely eliminates shadows. Segmentation of people in the high-traffic area is improved because the true background (the floor) is farther away than the people, so that Gaussians corresponding to it, instead of those for the more frequently observed people, are usually selected as part of the background model on the basis of depth. Finally, depth data allows better segmentation of people colored similarly to the background, resulting in fewer foreground holes due to color "camouflage."

Although the video displays and rotating sign do not appear in the result frames in FIG. 2, our method fails to exclude them from the foreground in a significant fraction of other frames. The relatively static person at the back of the room contains substantial foreground holes after he has been there for about three minutes. It is difficult to extend this time without further compromising the modeling of the dynamic background objects in the scene. Adaptation to the moving of the chair requires about 2 minutes, and cannot be shortened without causing all of the above problems to worsen. A rapid illumination change would cause the system to fail completely until adaptation occurs. It would seem that we are reaching the limits of what can be accomplished by considering pixels in isolation, and we therefore seek to enable correction from higher levels of processing, as presented in the following sections.

Corrective Feedback

We extend the TAPPMOG modeling framework to make use of a wide variety of feedback computed by modules that consider image regions or frames, classify objects, or analyze other scene properties above the per-pixel level. Each module computing this feedback should satisfy two requirements. First, it should have some "high-level" definition—that is, one in terms of concepts above the pixel level—of what belongs in the foreground, what should be excluded from the foreground, or both, and it must have some ability to discriminate between cases that fit this definition and others that do not. Second, it should be able to provide maps that designate which pixels in a given input frame are responsible for cases that satisfy this definition.

Figure 3:
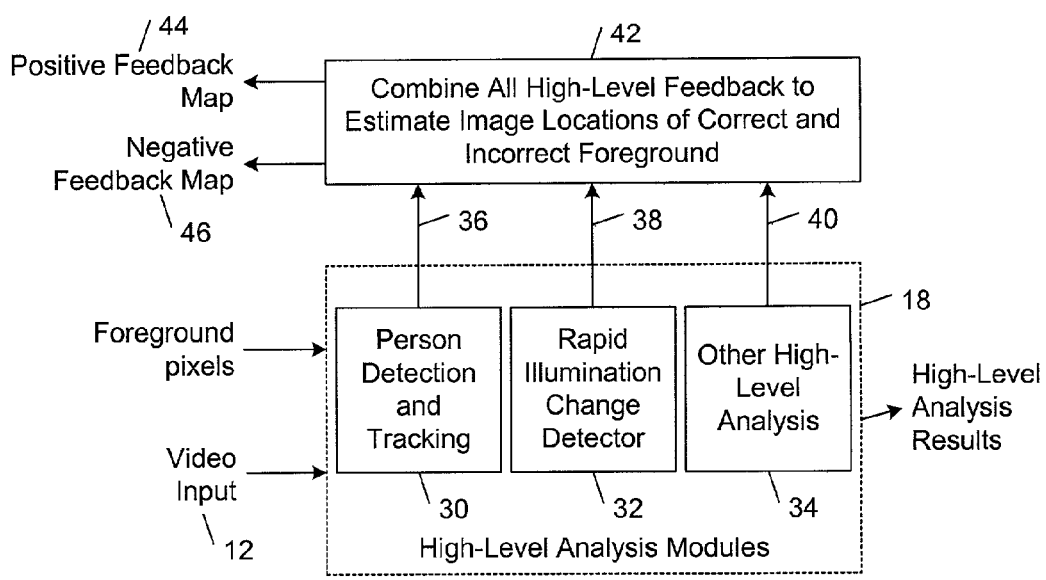
FIG. 3 is a block diagram of a system for providing a positive feedback map and a negative feedback map based at least in part upon a combination of multiple high-level analyses of video input and video input segmentation results.

Referring to FIG. 3, in one embodiment, one or more high-level analysis modules, such as a person detection and tracking module 30, a rapid illumination change detector 32, and a module 34 configured to perform some other high-level analysis (e.g., a non-person detector), are configured to generate respective confidence maps 36, 38, 40. Each confidence map 36–40 associates pixels with respective measures of segmentation accuracy. Confidence maps 36–40 are generated based upon analyses of video input 12 and the segmentation results received from segmentation module 16. As explained in detail below, confidence maps 36–40 are combined (or merged) by a merging module 42 to obtain estimates of correct and incorrect foreground segmentation.

In this embodiment, we make use of two types of feedback: 1) positive feedback, which serves to enhance correct foreground segmentations; and 2) negative feedback, which aims to adjust the pixel-level background model in order to prevent the reoccurrence of detected foreground segmentation mistakes. In this regard, thresholds may be applied to the combined results to obtain a positive feedback map 44 and a negative feedback map 46. The positive feedback map 44 identifies pixels that are segmented correctly as foreground, and the negative feedback map 46 identifies pixels that are segmented incorrectly as foreground. In this embodiment, the feedback interface between the TAPP- MOG background model and the higher levels consists of two bitmaps respectively representing pixels where positive and negative feedback should be applied based on the latest foreground segmentation. A bitmap is defined as an image whose pixels may each contain only a value of 0 or 1. In other embodiments, the feedback maps may consist of real numbers rather than bitmaps. We denote the feedback maps for positive and negative feedback as P and N, respectively.

The results generated by the person detection and tracking module 30 are used to produce feedback that enhances the TAPPMOG's segmentation of people, and helps it to ignore all else. Positive feedback is generated for image regions where the person tracker believes people are present, while all other foreground pixels are assumed not to pertain to people, and are associated with negative feedback. In particular, the person detection and tracking module 30 uses depth data to create overhead, "plan-view" images of the foreground produced by the segmentation module 16. Tracking module 30 then uses templates and Kalman filltering to detect and track people in these images. For each tracked person, positive feedback (with a value of 1) is generated at all pixels within the camera-view bounding box of the set of pixels that contributed to the person's plan-view image representation. This generally causes some true background pixels to be incorrectly labeled with positive feedback, but, as discussed below, it is generally harmless when feedback maps are imprecise in this way. The overall positive feedback map is produced by summing the maps generated for the individual people. Negative feedback (with a value of −1) is generated at all foreground pixels not inside any of the individual bounding boxes.

The rapid illumination change detector module 32 detects rapid changes in global illumination, camera gain, or camera position. When it detects any of these events, it produces negative feedback (with a value of −1) at all current foreground locations so that the TAPPMOG will quickly update itself to reflect the new scene appearance. The feedback is generated not just at the event onset, but for a time window long enough to allow for good TAPPMOG adaptation to the changes. The module decides that one of these events may have occurred whenever the TAPPMOG suddenly produces a large amount of foreground that is well distributed about the image. Shape information, from the depth data, is then used to discriminate these events from the possibility that a foreground object has closely approached the camera, occupying most of its field of view. In this case, we do not want to rapidly update the background model.

In embodiments that use multiple high-level modules to generate feedback maps, merging module 42 is operable to combine these maps and resolve conflicts between them in order to produce the positive feedback and negative feedback bitmaps. Merging module 42 may be configured to allow strong positive evidence to override negative evidence (or vice versa). Merging module 42 also may be configured to permit individual modules to generate both positive and negative feedback, enable multiple forms of relatively weak feedback to support each other when none are convincing in isolation, and to allow the feedback bitmaps to be refined by canceling out selected portions of them where conflicting information exists. In one embodiment, each high-level module 30–34 generates a map of real numbers, where positive numbers reflect confidence that the segmented pixel should be part of the foreground, and negative numbers reflect the opposite. We then add up the feedback maps that are generated by all high-level modules, thereby producing a "feedback sum" image. We create P by "thresholding" the feedback sum image at 1; in other words, we set pixels in P to 1 where corresponding pixels in the sum image have a value greater than or equal to 1, and we set pixels in P to 0 at all other locations. We create N similarly by thresholding the feedback sum image at −1, so that N contains value 1 at pixels corresponding to pixels in the sum image with values less than or equal to −1, and N contains value 0 at all other pixels. This method allows us to factor the relative confidences associated with various high-level decisions into the final choice of corrective action to take at each pixel.

Figure 4:
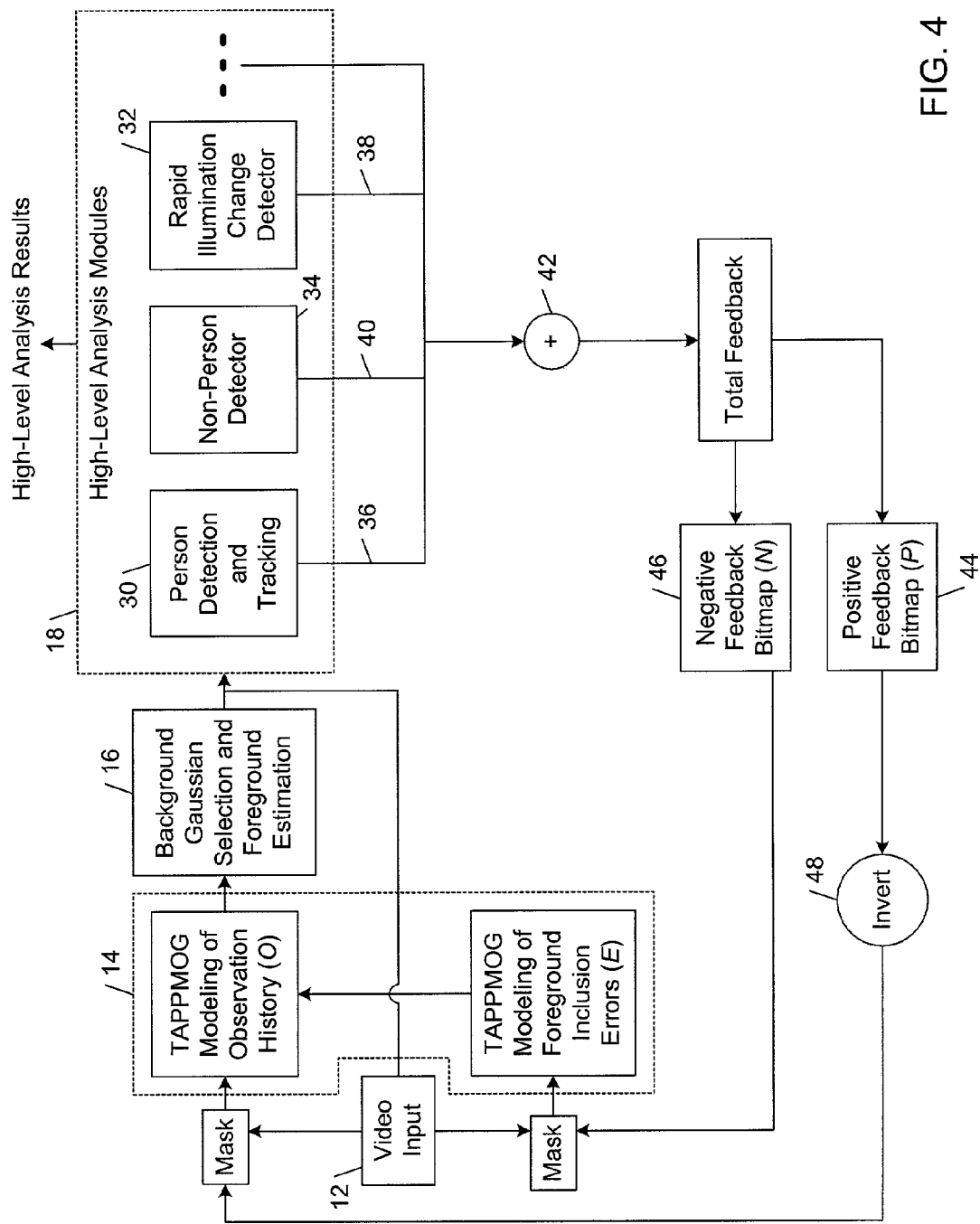
FIG. 4 is a block diagram of a system for segmenting video input based at least in part the positive feedback map and the negative feedback map of FIG. 3.

The methods by which positive and negative feedback influence pixel-level background modeling are different, and are discussed in the subsections below. These methods are suitable for use not just with the TAPPMOG modeling scheme described above, but also with all TAPPMOG methods. FIG. 4 summarizes the feedback process.

Positive Feedback

The goal of positive feedback is to prevent observations associated with correctly segmented foreground from being incorporated into the pixel-level background model. In the test sequence described above, the two cases for which this would be most helpful are those of the relatively static person toward the back of the room, and the high-traffic area in the lower right of the frame. In the first case, when no feedback is used incorporation of the person into the background over time causes him to gradually fade out of the foreground, so that he can no longer be well tracked or analyzed. In the second case, without feedback the true background is seldom visible for a long time; eventually, the background model begins to reflect some average or common properties of the people walking in that space, and segmentation suffers.

Referring to FIG. 4, positive feedback is implemented as follows. First, one or more high-level modules 30–34 detect correct foreground segmentation results, by one or more definitions, and contribute positive feedback at all pixels responsible for these results. This feedback propagates to bitmap 44 (P) as described above. Next, P is inverted (zeros changed to ones and vice versa) by inversion module 48 so that for all pixels in the inverted bitmap that have a value of 0, we do not use the current pixel observation of video input 12 to update the Gaussian mixture model of the observation history. This results in no change in the background model at those pixels, and prevents the foreground objects from becoming part of the background over time. In general, it is relatively unimportant that P be precise at the pixel level. Pixels accidentally omitted from P cause some bit of true foreground to make it into the observation history model, while extra pixels included in P cause the true background to be learned slightly more slowly. In both cases, the same error must repeat many times before the effect is significant.

Negative Feedback

An erroneous inclusion in the segmented foreground is, by definition, something that we would prefer to be well-described by the background model. The goal of negative feedback, therefore, is to adjust the background model so that it better describes such errors, without disrupting its ability to describe other aspects of the background. In some embodiments, this process is implemented in two steps. First, we model the distribution of observations that are associated with foreground errors at each pixel using almost exactly the same TAPPMOG process that is employed for modeling the full observation history. The per-pixel models of the observation history and the foreground errors are denoted as O and E, respectively. Second, we periodically merge E into O so that changes in O will propagate into the subset of Gaussians selected as background. In this embodiment, a TAPPMOG is used to model the foreground errors because the distribution of observations associated with foreground errors at a given pixel can be, at worst, just as complex as observation distributions for highly dynamic, variable backgrounds. We merge this model into O, rather than replace O with it, because portions of O may still be accurate and useful. This is particularly true when the errors result from inadequate modeling of dynamic background objects. The errors have occurred because there was too little evidence in the observation history to support building an accurate model of them with sufficient weight to be chosen as background. Hence, the merging process boosts the relative proportion of evidence corresponding to things that were incorrectly omitted from the background model, without obliterating other highly weighted evidence.

The primary difference between O and E is that, while O accepts the camera input directly, E receives this input after it has been masked by the negative feedback bitmap N provided by higher levels of processing. This mask allows only foreground inclusion errors to be presented to E; no update of E occurs at pixels for which N contains a zero. Because the maximum complexities of what may be modeled by O and E are similar, we use mostly the same parameters for each. The main exception is that we use a higher learning rate $\alpha^e$ for E. Because error examples may be presented to this TAPPMOG rather infrequently, error model means and variances may converge very slowly if we were to use the same learning rate as for O, which receives input on every frame. In addition, from Equation (3), we see that the higher learning rate also causes the weights associated with E to increase more quickly. When O and E are merged as described below, these higher weights help compensate for the under-representation of the errors in the observation history.

To avoid excessive computational cost, we perform the merge process not on every frame, but at a low rate $\theta$ in the range of 0.1–2 Hz. Update of E based on high-level feedback is still done on every frame for which errors are found. It is relatively unimportant for N to be precisely correct at the pixel level. If N extends slightly beyond the true bounds of some erroneous foreground inclusion, the result will usually be the addition to E of further evidence to support the current background model. If N fails to include some of the pixels associated with a true error, E will just build up a little more slowly at those locations.

In this embodiment, when merging the Gaussian mixtures of O and E at a particular pixel, we do not simply make a new mixture that has one mode for each of the modes in the two original mixtures, since this would cause the complexity of O to grow without bound. Instead, we seek to keep the number of Gaussians at each pixel in O at or below the limit K. One way to merge the two mixtures under this constraint would be to convert each to a histogram representation, and then use an iterative Expectation-Maximization method to fit a mixture of K Gaussians to the sum of the two histograms. To do this accurately would be a rather costly process, particularly as the dimensionality of the observation feature space increases, so we instead employ the more approximate method described in pseudo-code below. In the description, we use "dist" to denote the distance between two vectors, and we denote variables corresponding to the observation history and error TAPPMOGs with superscript "o" and "e", respectively.

If total weight of pixel's error Gaussians is below a threshold $\kappa$, then decrease all weights by multiplicative decay factor $0<\tau<1$, else 1. For each error Gaussian $\eta_j^e$, in order of decreasing weight/variance
   For each observation Gaussian $\eta_k^o$, in order of decreasing weight/variance
   if means of $\eta_k^o$ and $\eta_j^e$ are near each other (specifically, $dist(\vec{\mu}_k^o, \vec{\mu}_j^e) < \beta(\sigma_k^o + \sigma_j^e)$) and $$\frac{w_j^e}{w_k^o} > \min \text{ weightratio}$$

then expand $\eta_k^o$ to cover $\eta_j^e$, and re-sort observation Gaussians by weight/variance.
   New $\eta_k^o$ parameters, denoted with "*", are:

$$\vec{\mu}_k^{o*} = (w_k^o \vec{\mu}_k^o + w_j^e \vec{\mu}_j^e)/(w_k^o + w_j^e)$$

$$\sigma_k^{o*} = \frac{1}{\beta} \max[dist(\vec{\mu}_k^{o*}, \vec{\mu}_k^o) + \beta\sigma_k^o, dist(\vec{\mu}_k^{o*}, \vec{\mu}_k^e) + \beta\sigma_k^e]$$

$w_k^{o*} = w_k^o + w_j^e$

2. For each error Gaussian $\eta_j^e$, in order of decreasing weight/variance
   if $\eta_j^e$ was not merged with some observation Gaussian in Step (1) and weight of $\eta_j^e$ is at least comparable to that of lowest-ranked (by weight/variance) observation Gaussian $\eta_l^o$ (specifically, $$\left(\text{specifically}, \frac{w_j^e}{w_k^o} > \min \text{ weightratio}\right),$$

then replace $\eta_l^o$ with $\eta_j^e$.
3. Normalize weights of observation Gaussians to add up to their sum prior to merging process, and re-sort by weight/variance.
4. Set weights of all error Gaussians used in merge to zero, and decrease all others by a multiplicative decay factor $0<\tau<1$.

Step 1 of the pseudo-code attempts to incorporate E into O by expanding Gaussians in the latter mixture to include the spaces spanned by nearby Gaussians in the former mixture. Note that a single observation history Gaussian may be expanded to include more than one error Gaussian. When merging two Gaussians, we add their weights, set the new mean equal to their weighted sum, and select the minimum variance large enough to cause all points that would have matched one of the original Gaussians to also match the merge result. Error Gaussians that are too far from any history model Gaussian are instead substituted for the weakest of them in Step 2, provided that we would not be replacing one Gaussian with another supported by far less evidence. We typically use minweightratio≈0.1. Step 3 serves to keep the relative scales of the observation and error model weights similar. Step 4 removes from E any evidence that has been transferred to O, and decays the rest of the error evidence so that noise and mistakes in error modeling do not build up over arbitrarily long times and cause significant, harmful changes in the observation history model.

The merge process is performed only at pixels for which a significant amount of error has accumulated, as determined by the error level threshold $\tau$. As $\kappa$ is decreased, less error evidence is needed to trigger a modification of O, and each modification will have smaller impact. For larger K, errors tend to be better modeled before they are merged into O, and individual merges occur less frequently but are more influential. This threshold, together with the error learning rate $\alpha^e$, also determine the minimum time required before repeated errors at a pixel result in a change in an update of O. The maximum timescale on which error accumulation can occur without being disregarded as noise is effectively set by the combination of $\kappa$, $\alpha^e$, and the error decay rate $\tau$.

Figure 5:
FIG. 5 is a view of a series of video frames, including two video frame series showing pixel level segmentation with and without high-level corrective feedback.

Referring to FIG. 5, we compare foreground segmentation results with and without this feedback for the same test sequence described with reference to FIG. 2. Several important differences are evident. First, without feedback, the relatively static person toward the back of the room (upper-middle of images) begins to fade into the background after less than 90 seconds of standing at his position (see frame 4). After a couple more minutes, he becomes difficult to separate from noise, so that tracking and any other analysis of this person becomes very challenging. However, when feedback from the person-tracker is used to prevent background model update at his location, he is well-segmented as foreground for the entire five minutes that he stands at his position, and would remain so indefinitely if the test sequence were longer. This is achieved without sacrificing model adaptation to other scene changes such as the moving of the chair near the midpoint of the sequence. The moved chair causes temporary foreground errors for both methods (see frame 2). With feedback, these errors are corrected in about 2 seconds, without disrupting segmentation elsewhere. Without feedback, chair errors linger for nearly two minutes, during which the person-tracker must detect and ignore them.

Inclusion of dynamic foreground objects such as the video displays and the rotating sign was virtually eliminated by using negative feedback. Early in the sequence, negative feedback is generated when the sign and displays occasionally appear in the foreground (see frame 1), until they stop appearing. When connected-components analysis is used to extract "significant" foreground objects, the rotating sign appears in no frames beyond the 2-minute mark of the sequence. In contrast, without feedback, the sign appears in 74% of foreground frames beyond the 2-minute mark, including all frames in FIG. 3. Similarly, in both sets of results, "display3" sometimes appears in the foreground soon after it is turned on around the 5.5-minute mark. After 2 minutes pass, significant parts of "display3" appear in only 5% of the foreground frames for the feedback-aided method, in contrast to 68% without feedback (see frames 4 and 5).

The foreground noise levels for the two methods are noticeably different toward the later frames of the test sequence. Without feedback, the variances in the TAPPMOG model drop to very low levels over time, so that imager noise frequently results in color or depth measurements that exceed the matching tolerance to the background model. With feedback, the system learns to increase these variances where they become problematically small. The lower noise levels result in more cleanly-segmented foreground regions, and less higher-level processing and analysis dedicated to the removal of image clutter.

Figure 6:
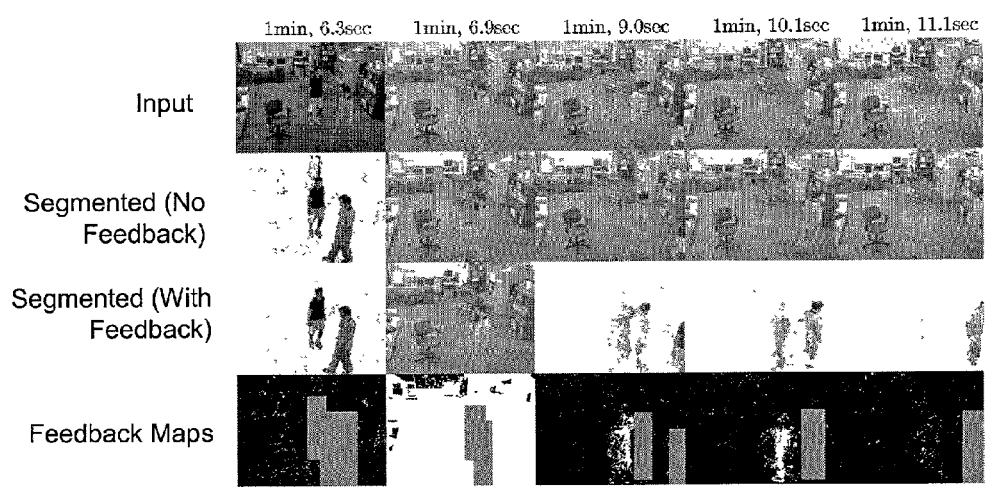
FIG. 6 is a view of the series of video frames of FIG. 5 in which the scene is subjected to a simulated change in global illumination.

Segmentation results with and without feedback are compared for a simulated change in global illumination in FIG. 6. The lighting change was simulated by applying a gamma correction of 2.0 to a one-minute portion of the test sequence of FIG. 2, beginning at the 1000th frame (a little over a minute into the sequence). For both methods, almost all of the image appears as foreground immediately after the illumination change (see frame 2). Without feedback, this condition persists for over 30 seconds while the background model adapts. The adaptation time could be reduced by increasing the TAPPMOG learning rate, but this would further lessen the time that a person, such as the one who appears near the back of the room later in the sequence, can remain relatively still before becoming part of the background. In contrast, when feedback is used, the illumination change is detected and causes negative feedback covering most of the frame to be generated for a short period of time. One such map is shown in the second column; note that the negative feedback is canceled where the person-tracker module estimates that people are present. Within 2 seconds, the background model is almost completely repaired, except where people occluded the background during the correction period (see frame 3). When these regions no longer are occluded, the person tracker module identifies them as not being people, and generates further, more localized negative feedback that repairs the background model here over the next two seconds (see frame 3–5).

It is important to note that the correction of most of the background model in under 2 seconds is fast enough to allow person tracking methods to continue to operate through rapid, frame-wide changes. By using prior history and probabilistic methods to estimate person locations during a brief interruption of reliable measurements, tracking can recover gracefully when the background is repaired quickly. Obviously, continuity of tracking is much less likely when an interruption lasts for more than 30 seconds, as was the case without feedback.

The systems and methods described herein are not limited to any particular hardware or software configuration, but rather they may be implemented in any computing or processing environment, including in digital electronic circuitry or in computer hardware, firmware or software. The various processing modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The video input segmentation methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims. For example, in addition to depth information, pixels may be segmented based upon stereo disparity information or both depth information or stereo disparity information, or both. The pixel-level historical models also may incorporate per pixel depth information or stereo disparity information, or both.

What is claimed is:

1. A method of segmenting video input characterized by a time series of video frames of observable pixel data, comprising:
maintaining one or more pixel-level historical models of spatially local pixel observations;
segmenting pixels into two or more labeled groups based at least in part upon comparison of pixel-level video input with the one or more pixel-level historical models; and
updating the one or more pixel-level historical models based at least in part upon one or more feedback maps identifying pixels respectively segmented into the one or more labeled groups in conformity with a spatially non-local segmentation model.

2. The method of claim 1, wherein a history of pixel observations at each pixel is modeled by a mixture of Gaussian distributions.

3. The method of claim 1, wherein pixels are segmented into a background group and a foreground group.

4. The method of claim 1, wherein a feedback map identifies pixels segmented correctly according to a spatially non-local segmentation model.

5. The method of claim 4, wherein the spatially non-local segmentation model defines spatially non-local observation characteristics of pixels belonging to one of the labeled groups.

6. The method of claim 4, wherein a pixel-level historical model is not updated at pixels identified as being correctly segmented.

7. The method of claim 1, wherein a feedback map identifies pixels segmented incorrectly according to a spatially non-local segmentation model.

8. The method of claim 7, wherein the spatially non-local segmentation model defines spatially non-local observation characteristics of pixels that should have been excluded from one of the labeled groups.

9. The method of claim 7, wherein a pixel-level historical model is updated at pixels identified as being incorrectly segmented.

10. The method of claim 9, wherein updating the pixel-level historical model at pixels identified as being incorrectly segmented comprises maintaining a per-pixel inclusion error model of pixel observations associated with occurrences of incorrect segmentation labeling.

11. The method of claim 10, wherein components of the per-pixel inclusion error model corresponding to individual pixels include respective mixtures of Gaussian distributions.

12. The method of claim 11, wherein updating a pixel-level historical model comprises merging a per-pixel historical model and a per-pixel inclusion error model.

13. The method of claim 1, further comprising generating the feedback maps based at least in part upon analysis of spatially non-local video frame features.

14. The method of claim 13, wherein the feedback maps are generated based at least in part upon one or more of an image region analysis, a frame-wide image statistics analysis, or an analysis of the object or event content of the video frames.

15. The method of claim 14, wherein one or more of the feedback maps are generated based at least in part upon depth information or stereo disparity information, or both.

16. The method of claim 1, further comprising generating one or more confidence maps associating pixels with respective measures of segmentation accuracy.

17. The method of claim 16, further comprising merging multiple confidence maps to produce a merged confidence map.

18. The method of claim 17, wherein the measures of segmentation accuracy are real numbers, and the step of merging multiple confidence maps comprises adding the multiple segmentation accuracy measures respectively associated with each pixel.

19. The method of claim 17, further comprising thresholding the merged confidence map to produce one or more feedback maps.

20. The method of claim 16, wherein each of the confidence maps is generated based at least in part upon one or more of an image region analysis, a frame-wide image statistics analysis, or an analysis of the object or event content of the video frames.

21. The method of claim 20, wherein a pixel-level historical model includes a mixture of Gaussian distributions of pixel observations.

22. The method of claim 1, wherein one or more pixel-level historical models incorporate per pixel depth information or stereo disparity information, or both.

23. The method of claim 1, wherein pixels are segmented based at least in part upon depth information or stereo disparity information, or both.

24. The method of claim 1, wherein one or more feedback maps are generated by one or more of a person detector and tracker module, a rapid illumination change detector module, a camera gain change detector module, or a sudden camera motion detector module.

25. A system for segmenting video input characterized by a time series of video frames of observable pixel data, comprising one or more processing modules operable to:
maintain one or more pixel-level historical models of spatially local pixel observations;
segment pixels into two or more labeled groups based at least in part upon comparison of pixel-level video input with the one or more pixel-level historical models; and
update the one or more pixel-level historical models based at least in part upon one or more feedback maps identifying pixels respectively segmented into the one or more labeled groups in conformity with a spatially non-local segmentation model.

26. The system of claim 25, wherein a history of pixel observations at each pixel is modeled by a mixture of Gaussian distributions.

27. The system of claim 25, wherein pixels are segmented into a background group and a foreground group.

28. The system of claim 25, wherein a feedback map identifies pixels segmented correctly according to a spatially non-local segmentation model.

29. The system of claim 28, wherein the spatially non-local segmentation model defines spatially non-local observation characteristics of pixels belonging to one of the labeled groups.

30. The system of claim 28, wherein a pixel-level historical model is not updated at pixels identified as being correctly segmented.

31. The system of claim 25, wherein a feedback map identifies pixels segmented incorrectly according to a spatially non-local segmentation model.

32. The system of claim 31, wherein the spatially non-local segmentation model defines spatially non-local observation characteristics of pixels that should have been excluded from one of the labeled groups.

33. The system of claim 31, wherein a pixel-level historical model is updated at pixels identified as being incorrectly segmented.

34. The system of claim 33, wherein the pixel-level historical model is updated at pixels identified as being incorrectly segmented by maintaining a per-pixel inclusion error model of pixel observations associated with occurrences of incorrect segmentation.

35. The system of claim 34, wherein components of the per-pixel inclusion error model corresponding to individual pixels includes respective mixtures of Gaussian distributions.

36. The system of claim 35, wherein a pixel-level historical model is updated by merging a per-pixel historical model and a per-pixel inclusion error model.

37. The system of claim 25, wherein one or more of the processing modules are operable to generate feedback maps based at least in part upon an analysis of spatially non-local video frame features.

38. The system of claim 37, wherein the feedback maps are generated based at least in part upon one or more of an image region analysis, a frame-wide image statistics analysis, or an analysis of the object or event content of the video frames.

39. The system of claim 25, wherein one or more of the processing modules are operable to generate one or more confidence maps associating pixels with respective measures of segmentation accuracy.

40. The system of claim 39, wherein one or more of the processing modules are operable to merge multiple confidence maps to produce a merged confidence map.

41. The system of claim 40, wherein the measures of segmentation accuracy are real numbers, and multiple confidence maps are merged by adding the multiple segmentation accuracy measures respectively associated with each pixel.

42. The system of claim 40, wherein one or more of the processing modules are operable to threshold the merged confidence map to produce one or more feedback maps.

43. The system of claim 39, wherein each of the confidence maps is generated based at least in part upon one or more of an image region analysis, a frame-wide image statistics analysis, or an analysis of the object or event content of the video frames.

44. The system of claim 43, wherein a pixel-level historical model includes a mixture of Gaussian distributions of pixel observations.

45. A computer program for segmenting video input characterized by a time series of video frames of observable pixel data, the computer program residing on a computer-readable medium and comprising computer-readable instructions for causing a computer to:

maintain one or more pixel-level historical models of spatially local pixel observations;

segment pixels into two or more labeled groups based at least in part upon comparison of pixel-level video input with the one or more pixel-level historical models; and update the one or more pixel-level historical models based at least in part upon feedback maps identifying pixels respectively segmented into the one or more labeled groups in conformity with a spatially non-local segmentation model.

* * * * *